May 1, 1962   L. B. GRIFFITH   3,032,496
ELIMINATION OF ALGAE IN AQUATIC PONDS
Filed Aug. 15, 1955
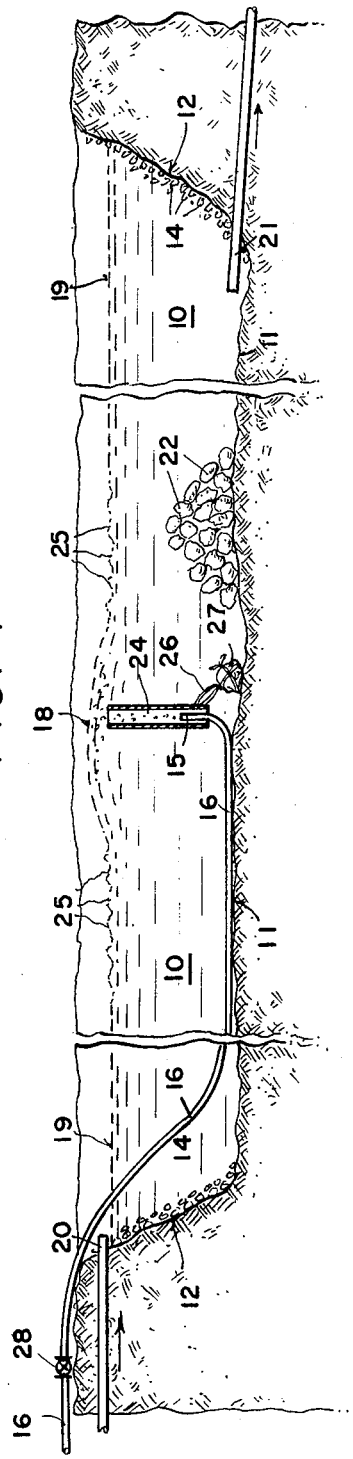
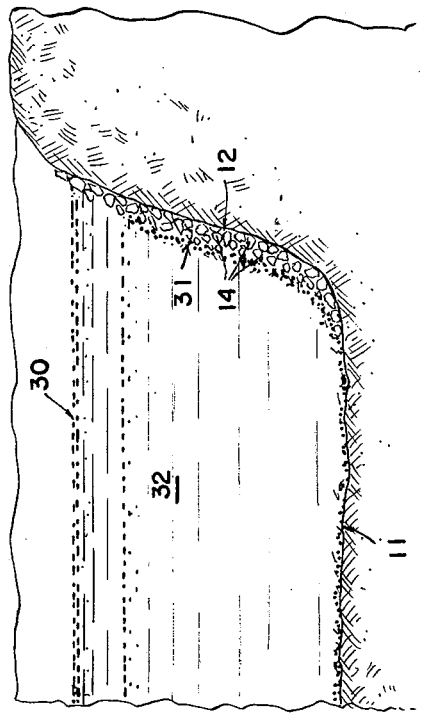
INVENTOR
LLEWELLYN B. GRIFFITH
BY Henry H. Snelling
ATTORNEY

United States Patent Office 3,032,496
Patented May 1, 1962

3,032,496
ELIMINATION OF ALGAE IN AQUATIC PONDS
Llewellyn B. Griffith, Arlington, Va.
(450 W. Broad St., Falls Church, Va.)
Filed Aug. 15, 1955, Ser. No. 528,405
9 Claims. (Cl. 210—14)

This invention relates to aquatic ponds and has for its principal object the provision of a method and means whereby to inhibit the formation of micro-biological organisms either on the surface of the pond as a scum, dispersed in the water of the pond, or adhering to surfaces on and near the bottom.

A further object of the invention is to clarify the water in an aquatic pond by bringing brown colored material from the bottom of the pond into contact with green and/or blue-green algae nearer the surface with the consequent destruction of the undesirable color of the water of the pond.

In the past, as designer of sewage treatment plants, I have built aquatic ponds between the plant and the stream which receives the effluent and stocked such ponds with water lilies, fish, etc., to prove visually that the liquid passing from my plant will not unduly contaminate a stream. In winter, such a showing is excellent, but in the warmer months, it seems impossible to prevent the formation of a green color on the surface of the pond, a blue-green color in the water itself, and brown organisms at the bottom of the pond, the latter making the water appear almost black and preventing one from seeing the bottom, even with the water only three or four feet in depth. Apparently the organisms are protozoa or, more likely, algae and the brown algae is of a different family from the blue-green and the green types as the two latter store starch while the brown algae never form starch from the sugar produced by photosynthesis, but contain laminarin instead.

In efforts to get rid of the scum and to make the water more transparent, my experiments indicate that while it is easily possible to clear a small surface area of the green algae by use of a water hose, the algae merely move to a different location. Agitation has also been tried but the cost is excessive and the results quite unsatisfactory. When, however, water from close to the bottom of the pond is caused to circulate over the surface of the pond, not only is the green scum entirely dissipated but the blue-green color of the water below the surface is eliminated and at the same time leaves and stones on the bottom of the pond can readily be seen. This indicates that the brown algae and the other two of the four types (the fourth type being the red algae, of no importance here) are incompatible when in close contact, each forming an algacide for the other.

FIGURE 1 shows an aquatic pond employing my invention.

FIGURE 2 shows a corner of the pond before treatment.

The pond 10 may be of any of the usual forms, being illustrated as a pond excavated by a bulldozer from an earth presenting a clay bottom 11. It is usual to pile a number of relatively large rocks 22 in about the center of the pond, which may be fifty feet or so long, and to line the sloping sides 12 with much smaller broken rocks 14. The depth of the water may be four feet, this being ample for the purpose intended. In my original experiment I fastened the end 15 of a light weight plastic air hose 16 just inside one end of an eight inch diameter stove pipe 24 somewhat over three feet long by a short piece of wire so that the stove pipe and air pipe could move together from horizontal to vertical by the flexing of the air pipe and I loosely tied the stove pipe, as by a piece of wire 26 to an anchoring rock 27 near the open end of the pipe proximate the free end of the air hose so the free end of the pipe could readily rise to the position shown in FIG. 1. When I admitted air through the hose by opening valve 28 the free end of the pipe thus rose and approached the water level 17 of the pond, forming a sort of air lift which produced a raised portion 18 of the surface, the water of which dome then flowed outward in all directions, causing ripples 25 in the nearby surface of the pond but leaving what seemed a quiescent surface 19 near the boundaries of the pond. After a few hours the entire water of the pond became clear, but when the air was turned off for an equal period of time, the green scum once more started to form near the entry point 20 to the pond of the sewage effluent from the treating plant having a secondary biochemical stage and finally extended all the way across the pond or to the exit pipe 21 leading to the stream which finally receives the liquid from the sewage plant.

In FIG. 2 the green algae 30 forms a scum over the surface of the pond, the brown colored material 31 covers the leaves, stones, etc. at the bottom of the pond, rising to about a foot or so from the surface, while the blue-green algae are below the surface and well above the brown colored material 31, for example, in the area 32.

The recirculation through the pipe 24 need not be great as a flow of about five gallons per minute is ample for a pond of seventy thousand gallons. A treating plant having a secondary stage is one having in addition to the usual primary settling stage a further purifying process which is stated by the "Manual for Sewage Plant Operators" prepared for the Texas State Department of Health, Austin, Texas, 1955, as including "slow and rapid sand filter beds, stone or trickiling filters under the general classification of biological filters, and activated sludge process."

A specific example of the claimed process is the treatment of sewage from the plant described in the March 1954 edition of "The American City," an article by J. E. Peck. This plant was designed by the present inventor for disposal of sewage from the Parr-Franconia government warehouse which was built in 1953 and which later developed problems of algae and rather serious fish kills in the tertiary-treatment pond. Attempts were made to get rid of the algae and the objectionable color by all sorts of means including vigorous circulation of water, the water being drawn from near the surface of the pond and discharged also near the surface. This rarely gave hopeful results and it was not until the water was drawn from the bottom of the pond and discharged at the surface with minimum agitation that the objectionable color at the top (green) and the objectionable color at the bottom (brown) and the objectionable color below the surface (blue-green) were all corrected and the pond made perfectly clear. The plant is now under the General Serivces Administration and serves a community of 600 people plus a number of residences which have more recently been added. The pond at this location is roughly 50' x 50' x 4' water depth. The drawings show that pond. The primary settling tank is followed by an aeration tank of the type illustrated in my Patent 2,653,-907 of September 29, 1953. As stated in the cited article, the plant is located about four miles upstream from Fort Belvoir, Va., which required that the sewage from the plant in question not adversely affect the water treatment facilities at the army fort which is located about fourteen miles from Washington, D. C. The term "aquatic pond" as used in the claims is to be taken in its usual meaning and therefore excluding not only tanks, pools with concrete bottoms, etc. but also oxidation ponds or lagoons which receive sewage from a single treatment.

What I claim is:
1. The method of inhibiting the formation of a green scum of micro-biological organisms on the surface of a pond having an earth bottom and receiving sewage from a sewage treating plant having a secondary biochemical stage, which pond if stagnant would have a colored scum on its surface which includes withdrawing water from the bottom of the pond and discharging such withdrawn water at the surface of the pond at a rate to prevent formation of said scum.

2. The method of maintaining in clarified condition the water of an aquatic pond having a clay bottom and sloping sides, the surface of the water being covered in part at least by micro-biological matter forming a scum with a greenish tint, and the bottom is covered with material of a brown color, which consists in withdrawing water from proximate the clay bottom and causing such water to rise above the normal water surface of the pond, flowing from such elevated portion toward the sloping sides of the pond.

3. The method of maintaining in clarified condition a stocked aquatic pond receiving effluent from a sewage plant having a primary settling stage and a secondary treatment step, which pond has a scum of green algae on its surface, a layer of brown material on its bottom and a blue-green algae dispersed in the water of the pond, which consists in blowing air into the pond near the bottom, thus causing a flow of water and brown material to the surface of the pond, raising the surface thereof, and bringing the two types of algae into contact with each other, with a consequent destruction of the algae.

4. The combination with a pond, of a tube lying on the bottom of the pond and pivotally anchored at one end, an air hose leading within the tube and means for intermittently admitting air through the hose to the tube, thereby causing the tube to move toward vertical position.

5. In a pond having at its earth bottom biological agents giving the water a brown appearance and proximate the surface microorganisms giving the water a green appearance and containing an effluent from an organic waste treatment plant having a secondary biochemical stage, means for recirculating the water of the pond by transferring to the surface of the pond water from a point proximate the bottom of the pond at a rate to cause a flow exceeding five gallons per minute.

6. The pond of claim 5 in which the means is located near the middle of the pond and discharges the water in roughly a vertical direction so as to cause the water surface of the pond to dome and the excess water to flow toward the various margins of the pond.

7. The pond of claim 5 in which the means is an air lift including a substantially vertical tube extending from proximate the earth bottom of the pond to a point proximate the water surface of the pond.

8. The method of eliminating the green algae color at the surface of an earth bottom aquatic pond which receives sewage from which the major portion of its solids have been removed by a settling step and it has then been treated by a secondary step in which the biological oxygen demand has been reduced, which comprises bringing into contact with the green starch-storing algae at the surface of the pond a habitat inimical to the said green algae by withdrawing water from proximate the earth bottom of the pond and discharging such withdrawn water at the surface of the aquatic pond until the surface water is free of said color, said discharging being at a rate to minimize agitation.

9. The method of maintaining the water in an aquatic pond in a transparent condition by inhibiting the formation of microorganisms which color the water, where the pond receives the effluent from a sewage treating plant of the type having primary settling means and also a secondary biochemical stage, and the pond has an earth bottom on which leaves and stones may be seen when the water is clear and the water near the bottom is given a brown color by material at that level; which method comprises bringing into contact with the microorganisms at the surface of the pond a habitat inimical to the said microorganisms by withdrawing water from proximate the earth bottom of the pond and discharging such withdrawn water proximate the surface of the aquatic pond until the surface water is free of said color, said discharge being at a rate to minimize agitation, whereby the said microorganisms and the said brown colored material by coming proximate each provide an environment incompatible with growth of the other, hence leaving the pond water clear.

References Cited in the file of this patent

UNITED STATES PATENTS

| | | |
|---|---|---|
| 547,978 | Wells | Oct. 15, 1895 |
| 1,574,783 | Beth | Mar. 2, 1926 |
| 1,643,273 | Imhoff | Sept. 20, 1927 |
| 1,734,011 | Harrison | Oct. 29, 1929 |
| 1,867,512 | Kusch | July 12, 1932 |
| 1,937,434 | Piatt | Nov. 28, 1933 |
| 2,077,907 | Streander | Apr. 20, 1937 |
| 2,246,224 | Streander | June 17, 1941 |
| 2,266,386 | Shafor | Dec. 16, 1941 |
| 2,379,554 | Tyler | July 3, 1945 |
| 2,638,444 | Kappe | May 12, 1953 |
| 2,676,921 | Vansteenkiste | Apr. 27, 1954 |

OTHER REFERENCES

Steel: "Water Supply and Sewerage," 2nd ed., New York, McGraw-Hill, 1947, pp. 240, 241, 245 and 246.

McMullin: "Control of Algae," American Railway Engineering Assn., vol. 51, Bulletin 483, pp. 155–157.